Patented Dec. 30, 1952

2,623,891

UNITED STATES PATENT OFFICE 2,623,891

PHENOLIC COMPOUNDS

Friedrich Jakob Hermann, Delft, Netherlands

No Drawing. Application May 19, 1947, Serial No. 749,088. In the Netherlands March 29, 1946

8 Claims. (Cl. 260—410.5)

Most of the well-known phenolic resins lack one highly valuable property, namely elasticity. If elastic products are to be made from phenolic resins, softeners have to be added. For casting resins glycerol, for example, is used for this purpose, and for varnish resin oils are used. Such additions always cause a deterioration of the typical properties required for several purposes of the pure phenolic resins (mechanical strength, resistance to chemicals, water and, in special cases, atmospheric influences and rapid drying resins).

According to Ind. Eng. Chem. Industrial Edition vol. 33, page 965 (1941), para-para'-dihydroxydiphenyl-propane, -butane or -pentane can be used among other substances for the preparation of synthetic resins. These compounds are prepared from the corresponding ketone, for example acetone, and consequently contain only one carbon atom between the phenol residues. The atoms in these molecules are not mobile with respect to one another, so that the resins thus obtained, like the above-mentioned phenolic synthetic resins, are not elastic.

There is a large group of synthetic resins of which a characteristic property is a very good elasticity. The types of resins belonging to this group are characterized by long-chain molecules (for example polyvinyl- polyacryl- or polyamide resins). These resins have uses to which phenolic resins are not suited, but they are unable to replace the latter in spite of their better elasticity, because they are inferior in some respects to phenolic resins. Thus the resins from which elastic coatings and articles can be made are very viscous. This on the one hand, causes the manufacturing technique to be very difficult, while on the other hand, when the resins are used in varnishes, very thin coatings are obtained and it is necessary to apply several coats. Moreover, these resins resoften at higher temperatures, and they remain liable to attack by solvents.

There have also been described phenol-aldehyde resins having a certain flexibility, namely those prepared by the condensation of an aldehyde with a bis-hydroxyphenyl compound in which the hydroxyphenol groups are separated by a carbon chain of at least five carbon atoms. These bis-hydroxyphenyl compounds are obtained by reacting an excess of phenol with a diol. After curing, the resins give coatings which are elastic, but of which the resistance, for example, to solvents and the hardness are often not entirely satisfactory. Probably this is due to the fact that between the chains only Van der Waals' forces are exerted, so that they can be disturbed rather easily, though the extremities are firmly fixed by the phenolic resin binding.

This invention is based on the observation that there can be obtained from phenols and aldehydes resins which combine the good properties of the various kinds of resins described above, when the starting-materials are polyphenolic compounds containing at least three phenolic nuclei in which the phenolic nuclei are joined together by chains comprising at least two and preferably five, or still better nine, atoms. In the above-mentioned chains the atoms have a certain mobility with respect to each other. It may be assumed that this mobility is maintained to a certain extent after curing, that is, the union of the several molecules by means of —$CH_2$—O—$CH_2$— or $CH_2$-groups, for the films and other products thus prepared from these phenols possess a remarkable elasticity. As compared with resins prepared from bi-phenols, the resins from the aforesaid polyphenolic compounds have the considerable advantage of a greater "molecule-density" as a result of their greater functionality, and they are consequently harder and, moreover, more resistant to solvents and various chemicals.

It is not neecssary for the chain between the phenol nuclei to consist exclusively of carbon atoms, but it is necessary that in each polyphenol molecule at least three of the phenol nuclei united by such a chain possess at least one reactive position each.

The preparation of the synthetic resins is conducted in the manner usual in the plastics industry by reacting the polyphenolic compounds with an aldehyde, for example formaldehyde. These resins can be used to replace the usual phenolic resins in all their existing uses; consequently the invention is not limited to the preparation of any particular kind of resin. It is possible, for example, to prepare varnishes from these resins by dissolving them in oil, and the varnishes so obtained may be air-drying varnishes or stove enamels; solutions of the resins in organic solvents can also be used as enamels, and by the addition of a substance having an acid reaction these solutions can sometimes also be made to give a dry film in the air.

Polyphenolic compounds containing at least three phenolic nuclei in admixture with the usual phenols can be condensed without difficulty with formaldehyde or other aldehydes used in the synthetic resin industry. Thus polyphenolic compounds can be used, which, for example, after their preparation in the presence of a catalyst have been freed only from the catalyst and not from any mono- or bi-phenol which may be present, and which are for that reason very cheap, for it has unexpectedly appeared that a certain proportion of mono- or bi-phenol is not harmful, provided the number of phenolic nuclei per molecule amounts to an average of at least about 2.2 and preferably at least 2.5. It is even possible under certain conditions to leave in the mixture, the catalyst which may have been used in the preparation of the polyphenolic compounds, namely when this catalyst is capable of assisting the formation of the resin, or at least when it does not counteract the reaction.

The special advantages of resins prepared in accordance with the invention also appear in the products manufactured from these resins. Thus, varnishes prepared from these resins may contain a smaller amount of oil than has hitherto been possible for such products. Consequently these varnishes are much more resistant to atmospheric influences, water and chemicals, while they can be considerably more quickly-drying. Threads can be drawn from resins prepared in accordance with the invention. Furthermore, it is possible to cause such resins to undergo still other conversions such as are known for the usual phenolic resins. By sulphonating the resins prepared in accordance with the invention tanning and textile auxiliaries can be prepared. Alternatively the polyphenolic compounds can be sulphonated before the condensation with the aldehyde.

The polyphenolic compounds containing at least three phenolic nuclei can very conveniently be obtained by the reaction of phenols with suitable unsaturated carboxylic acids, such as linseed oil fatty acid, oiticica fatty acid, eleaostearic acid, ricinolic acid, the "talloil" fractions containing fatty acids, oleic acid, etc. There is a great advantage in using mixtures of fatty acids containing acids with more than one double bond. For the purpose in question the above-mentioned components are reacted in the presence of a sufficient proportion of a catalyst, for such a time that both carboxylic groups and double bonds of the unsaturated fatty acids react with the phenols, and that a mixture is formed in which the average number of phenolic nuclei per polyphenolic molecule amounts to at least 2.2 and is preferably more than 2.5. For technical reasons these mixtures are not allowed too high an acid value, wherefore the reaction is continued till the acid value is not over 50 and the saponification value not over 90. The polyphenolic compounds thus prepared must have a hydroxyl value of at least 90. Preferably the conditions stated above are chosen in such a manner that the acid, saponification and hydroxyl values are not over 40 and preferably not over 30, not over 80 and preferably not over 65, and more than 100 or preferably more than 120 respectively. Such products can be considered as technically neutral.

Examples of suitable phenols are phenol, metacresol and resorcinol.

Excellent results have been obtained using $ZnCl_2$ and $BF_3$ as catalysts. Often several catalysts in succession, or mixtures of catalysts can be used. It is also possible to vary the concentration of the catalyst during the reaction.

At least one molecule of phenol is used per carboxyl group; as a rule, however, the proportion of phenol is greater.

The reaction takes place at normal or raised temperatures, depending on various factors which can best be determined experimentally. The reaction is affected, for example, by the proportion and composition of the catalyst and the activity of the components. Generally good results have been obtained for $ZnCl_2$ at about 130–160° C., and for $BF_3$ at lowered, normal or slightly raised temperatures. The proportion of $ZnCl_2$ can be smaller than that of $BF_3$.

If the reaction products described above are heated, for example to 300° C., they grow more and more viscous, while the molecular weight increases. Probably this is a result of the continuation of the polymerization already started during the reaction.

The state of the reaction products described varies from liquid to solid at room temperature; the products generally contain besides the polyphenolic compounds having at least three phenolic nuclei a certain proportion of bi-phenols and in some cases of monophenols.

The compounds obtained in the manner described above are probably keto-phenols; they can be reduced at the keto-group by Clemmensen's process. The reduced products can be used for the same purposes. The resins can, of course, be mixed with various other materials when they are used, or, if permitted by the conditions of the reaction these materials may be added during the preparation of the resins in the known manner. As examples, pigments, fillers and thinners are mentioned.

The following examples illustrate the invention without the latter being limited thereby. Unless otherwise stated the molecular weights have been determined by the decrease of freezing-point.

Example 1

24 grams of technical linseed-oil fatty acid, 50 grams of phenol and 45 grams of $ZnCl_2$ are reacted while stirring for three hours at 130–140° C., and for a further three hours at boiling temperature while refluxing. After the mixture has been acidified by the addition of hydrochloric acid, the excess of phenol is eliminated by steam distillation. The residue is taken up in ether and successively washed with dilute hydrochloric acid, water, a solution of $(NH_4)_2CO_3$ and a saturated NaCl-solution.

After drying over $Na_2SO_4$ the ether is distilled off and 36 grams of a thick oil are obtained. This oil has the following characteristics: acid value 40, saponification value 64, hydroxyl value 185. The molecular weight of the reaction product amounts to about 860; it contains 2.8 phenolic nuclei per molecule.

Example 2

50 grams of $ZnCl_2$ are dissolved in 200 grams of linseed-oil fatty acid, 200 grams of metacresol and 200 grams of xylene. The mixture is heated so that the water formed by the reaction is continually distilled off together with the xylene, which continuously flows back to the reaction mixture. After three hours' reaction a further 20 grams of $ZnCl_2$ is added, after which the reaction is continued for four hours. The xylene is then eliminated by distillation, and after the addition of 50 grams of $ZnCl_2$ the mixture is heated at 180° C. while stirring for 8 hours. After successively washing with warm hydrochloric acid of 10 per cent. strength and boiling water, a very viscous condensation product is obtained possessing the following characteristics: acid value 45, saponification value 70, hydroxyl value 145 and molecular weight 1020. From this data it can be calculated that per molecule of the condensation product there are 2.6 phenolic nuclei.

Example 3

75 grams of linseed-oil fatty acid, 100 grams of cresol (containing 55% of the metal-compound), 18 grams of $ZnCl_2$ and 5 grams of $AlCl_3$ are maintained for 15 hours at 130° C. while passing $CO_2$ over the mixture.

After acidulation and steam distillation the mass is taken up in either and successively washed several times with a saturated NaCl-solution, a soda-solution and again a solution of NaCl.

After drying and evaporation of the ether a brown syrupy mass is obtained, the characteristics of which are: acid value 9, saponification value 45, hydroxyl value 120. The molecular weight of the reaction product is 1680; the number of phenolic residues per molecule of the reaction product is 3.6.

Example 4

20 grams of $H_2SO_4$ (specific gravity 1.8) are added drop by drop in half-an-hour, while stirring, to 50 grams of oleic acid and 35 grams of phenol cooled in ice to 5–7° C. The mixture is allowed to reach room temperature and is maintained at this temperature for 24 hours. The mixture is then heated to 65° C., maintained at this temperature for 45 minutes and poured out into water. An oil separates which, after being washed several times has the following characteristics: acid value 124, saponification value 160, hydroxyl value 75. 30 grams of the oil thus prepared are heated together with 40 grams of phenol and 15 grams of $ZnCl_2$ for three hours at 130° C. and then for four hours at 175° C.

After a treatment as described in Example 3, a thick oil with the following characteristics is obtained: acid value 30, saponification value 64, hydroxyl value 146, molecular weight 830, number of phenolic nuclei per molecule 2.2.

Example 5

3 grams of $BF_3$ are added to 25 grams of soya fatty acid and 60 grams of phenol at 30° C. After the mixture has been maintained at 30° C. for 12 hours a further 10 grams of $BF_3$ are introduced. The mixture is then maintained for a further 12 hours at 30° C. and finally heated for one hour in a boiling water-bath.

After elimination of the $BF_3$ and the excess of phenol, an oil is obtained having the following characteristics: acid value 40, saponification value 40, hydroxyl value 197 and molecular weight 1060.

3.7 phenolic nuclei are combined per molecule of the condensation product.

Example 6

During 5 hours 30 grams of oleic acid are added drop by drop to 30 grams of phenol and 7 grams of $ZnCl_2$ while stirring, the temperature being maintained at 150° C. If the temperature of the mixture is then maintained at 150° C. for 12 hours and a treatment as described above is applied, a light-colored oil is obtained having the following characteristics: acid value 48, saponification value 92, hydroxyl value 126.

If, however, after the reaction and before the treatment 4 grams of $AlCl_3$ are added and the mixture is then heated for 15 minutes at 195° C., there is obtained, after a treatment as described, an oil having the following characteristics: acid value 35, saponification value 63, hydroxyl value 165, molecular weight 860, number of phenolic nuclei per molecule 2.5.

Example 7

20 grams of the condensation product of Example 2, 40 grams of butanol, 15 grams of paraformaldehyde and 3 grams of 30 per cent. ammonia are refluxed for four hours. A resin soluble in toluene is obtained which, after heating in a muffle for a short time at 160° C., gives a very hard film which even after 10 hours' of heating at this temperature is still elastic. The coating obtained is very resistant to solvents and chemicals. If the condensation product is reduced by Clemmensen's method before the reaction with paraformaldehyde, a resin is obtained which is somewhat more elastic than the resin previously described, but its stoving time is rather longer.

Example 8

A mixture of 20 grams, of the condensation product of Example 6, 7 grams of paraformaldehyde and 50 grams of ethanol is refluxed for 8 hours. When the product is heated in a muffle at 120° C. a hard, elastic coating is obtained within one hour.

Example 9

5 grams of the condensation product of Example 3 are dissolved in 14 grams of a 15 per cent. KOH solution. After the addition of 7.5 grams of formalin (40 per cent by volume) the mixture is kept for 12 hours at room temperature. The mixture is then acidified so as to separate the resol produced. This resol is washed with water and after being dissolved in toluene constitutes an excellent heat hardenable varnish.

Example 10

The resol prepared as described in Example 9 is hardened for five hours at 80–90° C. 0.4 gram of this hardened resol is mixed with 0.4 gram of wood oil. The temperature of the mixture is raised to 240° C. within 25 minutes and this temperature is maintained for a moment. The product is then dissolved in toluene as quickly as possible. The lacquer obtained can be used as an enamel or after the addition of a siccative as an air-drying varnish.

In both cases very quickly hardening or drying films respectively are obtained, which are particularly elastic and nevertheless possess a very high resistance to chemicals. The excellent properties described above remain after the addition of pigments.

Example 11

If, when fillers, auxiliary materials and phenolic or cresolic resins are ground together in the manner usual in the preparation of moulding powders, ⅕ part by weight of the resin used is replaced by a cured resol such as that used, for example, in Example 10, articles can be moulded which have a greater mechanical strength than articles moulded in the same way from the original moulding powder.

Instead of this resol, a novolak prepared in accordance with the present invention together with hexamethylenetetramine can be used.

Example 12

0.6 gram of resol prepared as in Example 9 are fused together with 1.7 grams of resin ester for 30 minutes at a temperature increasing from 100 to 250° C. Part of the resin obtained is boiled with 1.5 grams of stand-oil, while the temperature is allowed to rise to 270° C. After dissolving and adding a siccative an excellent lacquer is obtained.

Example 13

5 grams of the condensation product of Example 5, 5 grams of formalin (40 per cent. by volume) and 3 grams of KOH in a 15 per cent. solution are heated for one hour on a boiling water-bath. Then for three quarters of an hour water is distilled off under a vacuum at 60° C. 1.5 grams of lactic acid of 80 per cent. strength are then added and the vacuum distillation is continued for another ¾ hour. A very thick syrup is obtained which is soluble in toluene or in a mixture of alcohol and toluene, but not in alcohol alone.

When one part by weight of this syrupy mass is added to five parts by weight of a known high grade resin not yet completely cured and the mixture is cured in the usual way, a product is obtained which is more elastic than the known high grade resins.

What I claim is:

1. A method of preparing phenolic compounds containing at least three phenolic nuclei per molecule joined by chains comprising at least two carbon atoms, comprising heating a mixture of an unsaturated higher fatty acid, a phenol and zinc chloride at a temperature of at least 130° C. for a period of at least six hours and under continuous removal of the water formed in the reaction, the mixture containing at least 3 moles of phenol per each mole of unsaturated higher fatty acid, the heat treatment being continued until a product is obtained which, by test, has an acid value of not more than 50, a saponification value of not more than 90, and a hydroxyl value of at least 90.

2. The method of preparing technically neutral phenolic compounds containing at least three phenolic groups per molecule joined together by chains comprising at least two carbon atoms, comprising heating a mixture of a phenol and an unsaturated higher fatty acid in the presence of a dehydration catalyst, the mixture containing at least 3 moles of phenol per each mole of unsaturated higher fatty acid, and continuing the reaction until a product is obtained which by test has an acid value of not more than 50, a saponification value of not more than 90 and a hydroxyl value of at least 90.

3. The method of preparing technically neutral phenolic compounds containing at least three phenolic groups per molecule joined together by chains comprising at least two carbon atoms, comprising heating a mixture of a phenol and an unsaturated higher fatty acid in the presence of a dehydration catalyst, the mixture containing at least 3 moles of phenol per each mole of unsaturated higher fatty acid, and continuing the reaction until a product is obtained which by test has an acid value of not more than 40, a saponification value of not more than 80 and a hydroxyl value of at least 100.

4. The method of preparing technically neutral phenolic compounds containing at least three phenolic groups per molecule joined together by chains comprising at least two carbon atoms, comprising heating a mixture of a phenol and an unsaturated higher fatty acid in the presence of a dehydration catalyst, the mixture containing at least 3 moles of phenol per each mole of unsaturated higher fatty acid, and continuing the reaction until a product is obtained which by test has an acid value of not more than 30, a saponification value of not more than 65 and a hydroxyl value of at least 120.

5. The method as claimed in claim 2 wherein the phenol employed in the reaction is phenol.

6. The method as claimed in claim 2 wherein the phenol employed in the reaction is meta-cresol.

7. The method as claimed in claim 2 in which the unsaturated higher fatty acid employed in the reaction is technical linseed oil fatty acid.

8. The method as claimed in claim 2 in which the dehydration catalyst employed in the reaction is selected from the group consisting of zinc chloride and boron trifluoride.

FRIEDRICH JAKOB HERMANN.

REFERENCES CITED

The following references are of record in the file of this patent:

UNITED STATES PATENTS

| Number | Name | Date |
|---|---|---|
| 2,055,450 | Bender et al. | Sept. 22, 1936 |
| 2,147,547 | Reiff et al. | Feb. 14, 1939 |
| 2,154,969 | Bender | Apr. 18, 1939 |
| 2,321,627 | Rothrock | June 15, 1943 |
| 2,333,548 | Niederl | Nov. 2, 1943 |
| 2,341,454 | Lieber | Feb. 8, 1944 |
| 2,366,735 | Lieber | Jan. 9, 1945 |

OTHER REFERENCES

Adams et al., "Organic Reactions," vol. I, copyright 1942, John Wiley & Sons, New York, pages 159, 164, 179, 182.